United States Patent
Kinoshita (10) Patent No.: US 7,672,018 B2
(45) Date of Patent: Mar. 2, 2010

(54) IMAGE GENERATION SUCH THAT HALFTONE COLORS ARE EXPRESSED WITH DITHER PATTERNS SELECTED BASED ON DENSITIES OF GROSS AREAS OF DOTS

(75) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 495 days.

(21) Appl. No.: 11/696,930

(22) Filed: Apr. 5, 2007

(65) Prior Publication Data

US 2007/0242292 A1 Oct. 18, 2007

(30) Foreign Application Priority Data

Apr. 18, 2006 (JP) ............... 2006-114384

(51) Int. Cl.
   H04N 1/405 (2006.01)
   H04N 1/52 (2006.01)
(52) U.S. Cl. .......... 358/3.06; 358/3.11; 358/3.14; 358/3.22; 358/3.23; 358/535
(58) Field of Classification Search ........... 358/1.9, 358/3.06, 3.09, 3.11, 3.13, 3.14, 3.21–3.23, 358/534–536, 466; 382/162, 270
   See application file for complete search history.

(56) References Cited

U.S. PATENT DOCUMENTS

| | | | |
|---|---|---|---|
| 4,724,446 A * | 2/1988 | Hirahara et al. ........ | 358/3.06 |
| 6,530,637 B2 * | 3/2003 | Sawano ........ | 358/1.9 |
| 6,829,063 B1 * | 12/2004 | Allebach et al. ....... | 358/3.13 |
| 7,130,083 B1 * | 10/2006 | Konno et al. ........ | 358/3.06 |
| 7,385,730 B2 * | 6/2008 | Ogasahara et al. ........ | 358/3.11 |
| 7,492,481 B2 * | 2/2009 | Fujimori ........ | 358/3.12 |
| 7,580,156 B2 * | 8/2009 | Kakutani ........ | 358/3.13 |
| 2003/0038853 A1 * | 2/2003 | Moroo ........ | 347/15 |
| 2008/0049060 A1 * | 2/2008 | Kawatoko et al. ........ | 347/15 |

FOREIGN PATENT DOCUMENTS

| JP | 7-231384 | 8/1995 |
|---|---|---|
| JP | 2812401 | 8/1998 |
| JP | 2001-86358 | 3/2001 |
| JP | 2003-67293 | 3/2003 |
| JP | 2003-167694 | 6/2003 |
| JP | 2004-139158 | 5/2004 |
| JP | 2005-260553 | 9/2005 |

* cited by examiner

Primary Examiner—Scott A Rogers
(74) Attorney, Agent, or Firm—Oblon, Spivak, McClelland, Maier & Neustadt, L.L.P.

(57) ABSTRACT

An image is generated by performing area coverage modulation to express a halftone color according to a gross area of dots displayed in a pixel of the image. The image is generated in such a manner that the halftone color is expressed with a selected one of dither patterns corresponding to respective predetermined densities, each of the densities being determined by the gross area of dots calculated in view of shapes of the dots.

7 Claims, 6 Drawing Sheets

IMAGE GENERATION SUCH THAT HALFTONE COLORS ARE EXPRESSED WITH DITHER PATTERNS SELECTED BASED ON DENSITIES OF GROSS AREAS OF DOTS

BACKGROUND OF THE INVENTION

1. Field of the Invention

The present invention relates generally to an image generating apparatus and an image generating program product employing an electrophotographic method to generate an image by performing area coverage modulation to express halftone colors.

2. Description of the Related Art

In order to display or print out a monochrome gradation image with a display screen or a printer that can only display or print out two (binary) colors, i.e., black and white, the area coverage modulation method is employed. Specifically, the ratio of areas of black and white is varied to reproduce gradations (see, for example, Patent Document 1). Accordingly, the density pattern method is typically employed, which involves dividing each of the pixels in image data into a matrix of n×n. Each of the n×n sub pixels obtained by dividing the pixel (hereinafter, "sub pixels") is configured to display a black dot. To reproduce gradations, the number of black dots displayed by sub pixels in the matrix is varied according to the intended gradation level. In the conventional technology, when an image is generated by the area coverage modulation method, it is assumed that each sub pixel is a square, and gradations of the image are calculated simply based on the number of black dots displayed by sub pixels.

There are image generating apparatuses such as printers and copiers that can produce an image with hidden characters embedded therein. The hidden characters are hidden in the original but appear in a copy of the original, so that the copy can be distinguished from the original. There is a technology of treating the original image and the hidden characters by different dithering processes, so that an image is intentionally made unrecognizable (see, for example, Patent Documents 2, 3).

In the invention described in Patent Document 2, an image is output based on image data including dots of a first line number and hidden character data including dots of a second line number. In an original document, the hidden characters cannot be recognized. However, in a copy of the original document, the hidden characters clearly appear due to properties of the image generating apparatus used for making the copy.

In the invention described in Patent Document 3, dither patterns are generated for different line numbers and a density balance confirmation pattern is output. When it is determined that there are irregularities in the sampled density, a more appropriate dither pattern is selected to correct such irregularities. Accordingly, even if density levels differ among different apparatuses, it is possible to eliminate failures in which hidden characters do not appear.

Patent Document 1: Japanese Laid-Open Patent Application No. 2001-086358 (page 2)

Patent Document 2: Japanese Laid-Open Patent Application No. H7-231384 (FIG. 5)

Patent Document 3: Japanese Laid-Open Patent Application No. 2005-260553 (FIG. 2)

Figure 7:
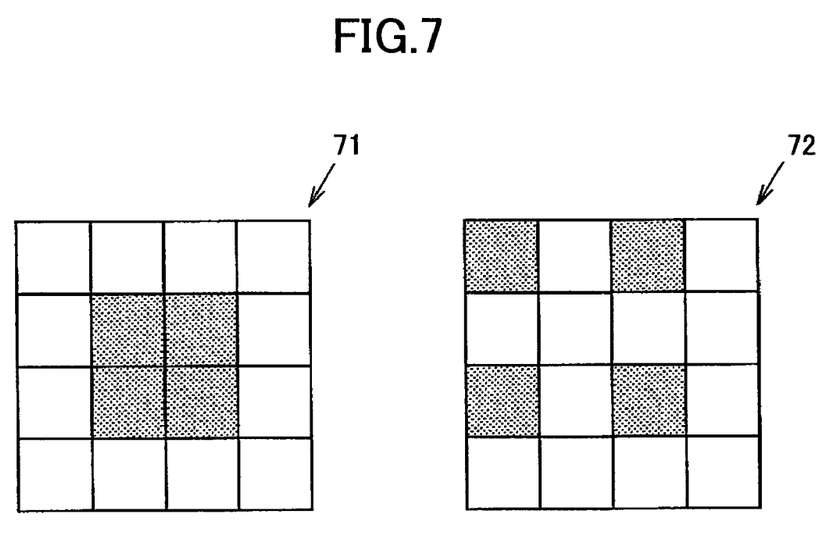
FIG. 7 illustrates pixels each expressing a density of 4/16 according to a conventional example.

However, when images are generated by the area coverage modulation, patches (irregularities) may appear in the gradation. FIG. 7 illustrates dither patterns 71, 72 of a pixel. The pixel is divided by 4×4=16 to form a matrix including 16 sub pixels. When none of the sub pixels are displaying black dots (0/16), the pixel displays white. When all of the sub pixels obtained by dividing the pixel are displaying black dots (16/16), the pixel displays black. The dither patterns 71, 72 both have four sub pixels displaying black dots. In the conventional technology, both of the dither patterns 71, 72 are used for expressing the same density level of 4/16. However, the actual output image using the dither pattern 71 and the actual output image using the dither pattern 72 appear to have different densities. This is probably because dither patterns express density levels based on the number of square sub pixels displaying black dots, which is inappropriate for expressing the actual toner density. That is, even if different dither patterns include the same number of sub pixels displaying black dots, the actual density may differ according to the positional arrangement of the black dots.

Figure 8:
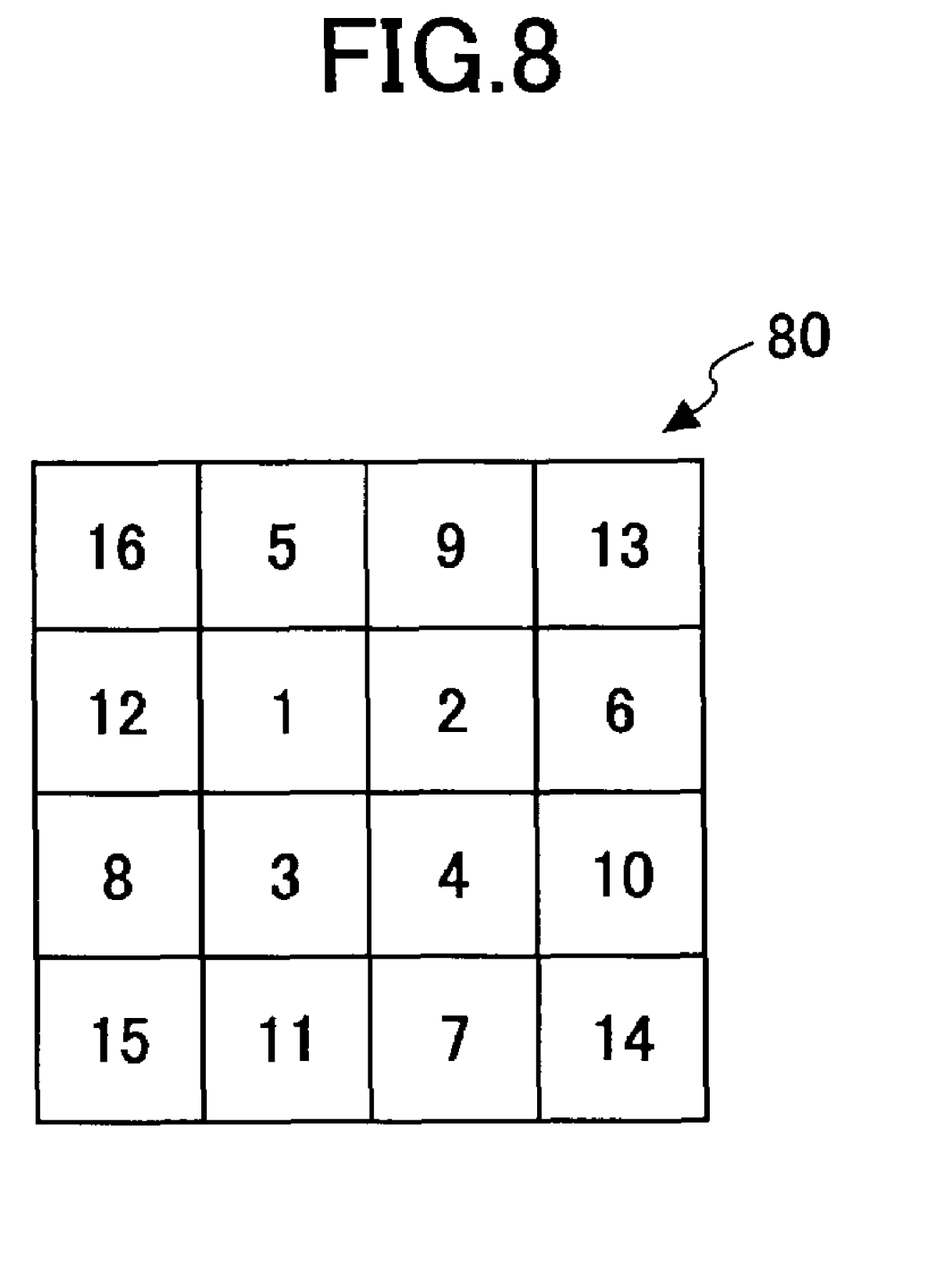
FIG. 8 illustrates a matrix used for expressing a halftone color according to a conventional example.

One approach is to use a matrix 80 as shown in FIG. 8 for expressing gradations. Each of the sub pixels configured to display a black dot in the matrix 80 is denoted with a number. These numbers represent the order in which the sub pixels display black dots according to the density level. To display an appropriate number of black dots corresponding to an intended density level, the black dots are displayed at sub pixels (positions) defined by the numbers. For example, to display a density level of 5/16, five black dots need to be displayed. Therefore, the five dots are displayed at the sub pixels denoted by "1"-"5" in the matrix 80. In this manner, by using the matrix 80, the positions of the black dots can be defined. As a result, it is possible to prevent spots (irregularities) from appearing in the gradations.

However, even by using the matrix 80, the density in an actual printout and the density in image data appear to be different. Furthermore, when the matrix 80 is applied for producing documents with hidden characters as described above, there are cases where the densities become inconsistent and the characters are not completely hidden.

SUMMARY OF THE INVENTION

The present invention provides an image generating apparatus and an image generating program product in which one or more of the above-described disadvantages are eliminated.

A preferred embodiment of the present invention provides an image generating apparatus and an image generating program product capable of generating an image with a density close to the intended density.

An embodiment of the present invention provides an image generating apparatus employing an electrophotographic method for generating an image by performing area coverage modulation to express a halftone color according to a gross area of dots displayed in a pixel of the image, the image generating apparatus including a control unit configured to generate the image, in response to receiving a pixel gradation instruction, in such a manner that the halftone color is expressed with a selected one of dither patterns corresponding to respective predetermined densities, each of the densities being determined by gross areas of dots calculated in view of shapes of the dots.

An embodiment of the present invention provides an image generating program product employing an electrophotographic method for generating an image by performing area coverage modulation to express a halftone color according to a gross area of dots displayed in a pixel of the image, the image generating program product causing a control unit to execute a procedure including the step of generating the image, in response to receiving a pixel gradation instruction, in such a manner that the halftone color is expressed with a selected one of dither patterns corresponding to respective predetermined densities, each of the densities being determined by the gross area of dots calculated in view of shapes of the dots.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

First Embodiment

A first embodiment of the present invention is described with reference to FIGS. 1-3.

Figure 1:
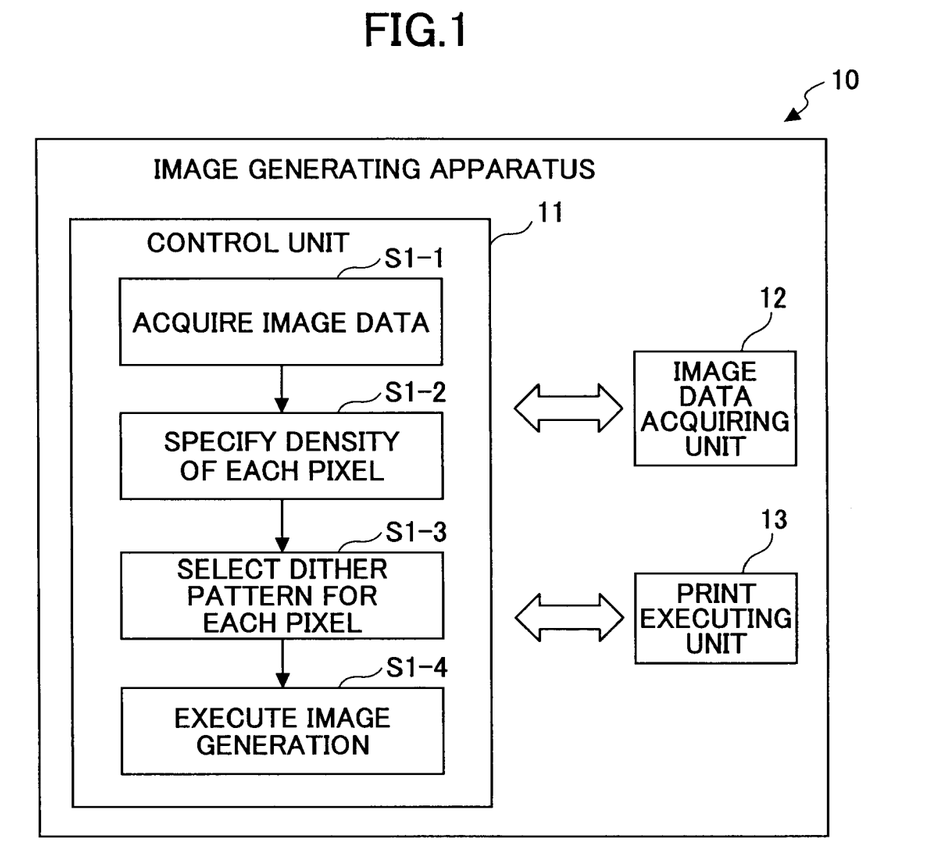
FIG. 1 is a block diagram of an image generating apparatus according to a first embodiment of the present invention.

As shown in FIG. 1, an image generating apparatus 10 according to the first embodiment is, for example, a printer or a copier used for printing documents by the electrophotographic method. The image generating apparatus 10 employs the area coverage modulation method to express gray, which is a color between black and white, with black toner. The image generating apparatus 10 includes a control unit 11, an image data acquiring unit 12, and a print executing unit 13.

The control unit 11 is connected to the image data acquiring unit 12 and the print executing unit 13. The control unit 11 includes a CPU, a RAM, a ROM, etc., which are not shown, to perform a process described below. The control unit 11 executes the generation of an image so as to display halftone colors.

The control unit 11 stores a dither pattern table (not shown). The dither pattern table includes dither patterns corresponding to different gradation levels. For example, a dither pattern according to the first embodiment is obtained by dividing one pixel into 4×4 sub pixels. Each dither pattern expresses a density corresponding to a gradation level with a combination of sub pixels. In the first embodiment, white is expressed when no dots are displayed in a pixel and black is expressed when all sub pixels in a pixel are displaying dots. Furthermore, in these dither patterns, it is assumed that each of the dots used for expressing the density of a halftone color is circular, and the density is determined based on the gross area of dots displayed in a pixel.

The image data acquiring unit 12 is an interface section connected to, for example, a not shown computer terminal. The image data acquiring unit 12 acquires image data generated in the computer terminal.

The print executing unit 13 is a unit for executing generation of an image. For example, when the print executing unit 13 is provided in a printer employing the electrophotographic method, the print executing unit 13 includes, for example, a mechanism for rotating a photoconductor to be charged, a section for controlling a charger, a section for controlling light emittance or scanning operations of a laser beam for forming an electrostatic latent image on the surface of the photoconductor, and a pressurizing section or a heating section for fixing toner onto the electrostatic latent image. The control unit 11 controls the print executing unit 13 so that the image generating apparatus 10 performs an exposing procedure with laser beams, a developing procedure, a transferring procedure, a separating procedure, and a fixing procedure to print an image on a sheet of paper. Specifically, the print executing unit 13 charges the surface of the photoconductor and forms an electrostatic latent image on the surface of the photoconductor in accordance with an image by irradiating the photoconductor with a laser beam. Furthermore, the print executing unit 13 makes toner adhere to the electrostatic latent image formed on the surface of the photoconductor to perform a developing procedure and form a toner image. The toner image is transferred onto a sheet of paper. After the toner has been separated from the surface of the photoconductor, heat and pressure are applied on the sheet of paper onto which the toner is resting to fix the toner on the sheet of paper.

Next, the operation of generating a dither pattern table is described with reference to FIGS. 2, 3.

Figure 2:
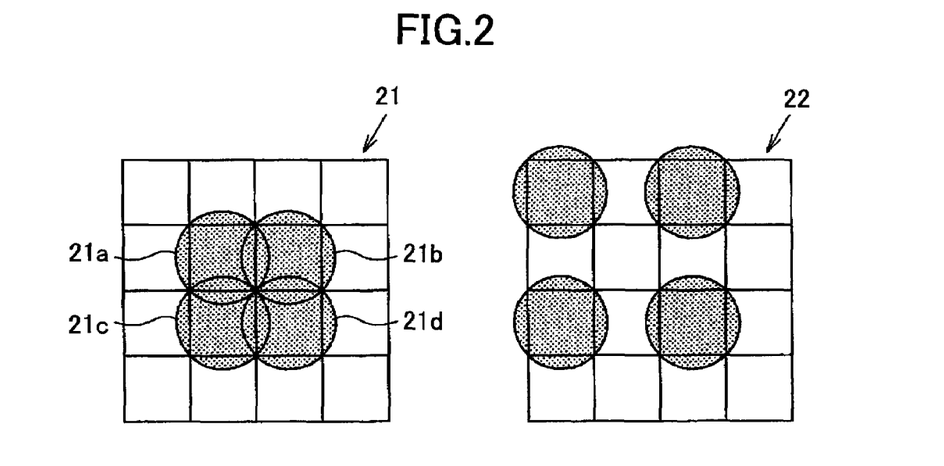
FIG. 2 illustrates dither patterns displaying four dots according to the first embodiment of the present invention.

FIG. 2 illustrates dither patterns 21, 22 in which a pixel is divided into 4×4=16 sub pixels. In the dither pattern 21, four dots (black) are displayed with portions overlapping each other. In the dither pattern 22, four dots (black) are displayed, which are arranged separately (spaced apart from each other). The dither patterns according to an embodiment of the present invention determine the density according to the gross area of the dots displayed in the dither patterns 21, 22; not according to the number of dots displayed (number of sub pixels displaying dots). For example, it is assumed that the diameters of each of the circular dots in the dither patterns 21, 22 are equal to the diagonal line lengths of the sub pixels. Assuming that the length of one edge of the sub pixel is "1", the area of the circle is π/2 (approximately 1.57).

In the dither pattern 21, four dots are displayed in four sub pixels forming a square. Because each circular dot is larger than each sub pixel, the four dots have portions that overlap each other. Therefore, the gross area of the four dots shown in the dither pattern 21 is calculated by subtracting the overlapping areas from the summed area of the dots.

Next, a specific method of calculating the gross area of the dots in the dither pattern is described.

Figure 3:
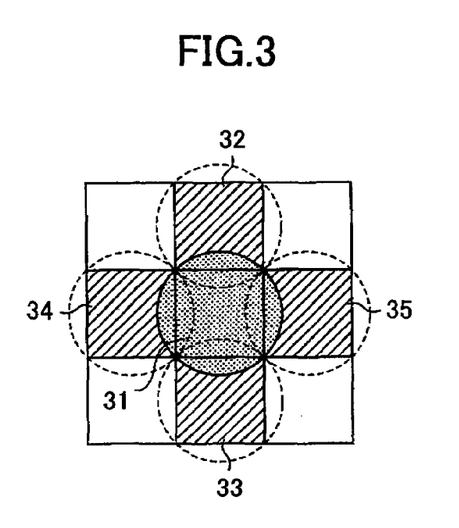
FIG. 3 illustrates the process of calculating a gross area of dots in a pixel.

As shown in FIG. 3, a sub pixel displaying a dot 31 is adjacent to sub pixels 32, 33, 34, 35 (portions filled with oblique lines), which are on the right, left, top, and bottom of the sub pixel displaying the dot 31. In the first embodiment, the number of dots displayed in the adjacent sub pixels 32-35 is calculated. For example, when dots are arranged in all of the adjacent sub pixels 32-35 on the right, left, top, and bottom of the sub pixel displaying the dot 31, the number of adjacent dots is four. When no dots are arranged in any of the sub pixels 32-35, the number of adjacent dots is zero. That is, the number of dots displayed by the adjacent sub pixels 32-35 ranges from zero through four.

In this manner, the number of adjacent dots is counted for all dots displayed in a pixel. Then, an overlapping area corresponding to the counted number of dots is subtracted from the summed area of the total number of dots displayed in the pixel.

A specific description is given by using the dither pattern 21 shown in FIG. 2.

In the dither pattern 21, a dot 21a is adjacent to two dots, a dot 21b and a dot 21c. The dot 21b is adjacent to two dots, the dot 21a and a dot 21d. The dot 21c is adjacent to two dots, the dot 21a and the dot 21d. The dot 21d is adjacent to two dots, the dot 21c and the dot 21b.

Accordingly, the number of adjacent dots in the dither pattern 21 is 2+2+2+2=8. Therefore, the overlapping area in the dither pattern 21 is (1.57−1)/4×8=0.57×2=1.14. The gross area displayed in the dither pattern 21 is calculated by subtracting the overlapping area from the summed area corresponding to the total number of dots, i.e., 4×1.57−1.14=5.14. The gross area of dots in a pixel is calculated in this manner when dots are arranged as shown in the dither pattern 21. The dither patterns are specified so that they have different density levels in units of 1/16.

The dither pattern 22 displays four dots arranged separately. Some portions of the dots are sticking out from the pixel. These portions sticking out are included in the gross area of dots, as they affect the density of the whole pixel. Specifically, the gross area of dots in the dither pattern 22 is calculated as 1.57×4=6.28.

As described above, the gross area of dots is calculated for each of the dither patterns, each including dots arranged at different positions. The positions of dots are determined so that the dither patterns have different density levels in units of 1/16. The determined positions are used to generate the dither pattern table.

Next, a process performed by the image generating apparatus 10 is described with reference to FIG. 1.

The control unit 11 of the image generating apparatus 10 acquires image data (step S1-1). Specifically, the image generating apparatus 10 receives, via the image data acquiring unit 12, image data sent by the computer terminal. The received image data are stored in the RAM of the control unit 11.

The control unit 11 specifies the density of each pixel (step S1-2). Specifically, the control unit 11 decomposes the image data into pixels, and specifies the density of each pixel based on gradation data of each pixel.

The control unit 11 selects a dither pattern for each pixel from the dither pattern table (step S1-3). The control unit 11 selects a dither pattern corresponding to a density level indicated by data specifying the density level of each pixel.

The control unit 11 then executes image generation (step S1-4). Specifically, the control unit 11 generates command signals for operating the print executing unit 13 to express each of the pixels by using the selected dither patterns, and outputs the generated command signals to the print executing unit 13. Accordingly, the functional units in the print executing unit 13 operate to print out an image based on the image data.

According to the first embodiment, the following effects can be achieved.

(1) The control unit 11 of the image generating apparatus 10 stores a dither pattern table. In the dither patterns, the dots for expressing densities of halftone colors are assumed to be circular. Each of the dither patterns is used for expressing a gradation level corresponding to a density defined by the gross area of dots displayed a each pixel. In the electrophotographic method, a laser beam used for generating images is usually circular or elliptical. Therefore, the shape of microscopic dots included in an image formed by laser beams is closer to a circle than a square.

In the dither pattern 22 shown in FIG. 2, each dot sticks out into areas of other sub pixels that are not displaying dots. Therefore, the gross area of dots is larger than the example shown in the dither pattern 21. In the area coverage modulation method, a larger gross area of dots means that more black portions are displayed, i.e., the density is higher. In the dither pattern 21, the dots are adjacent to each other, and therefore, there are overlapping portions and the gross area of dots is smaller compared to the dither pattern 22. By defining the extent of dots displayed in a pixel in terms of the gross area, it is possible to make the density closer to the actual toner density.

Particularly, for higher gradation levels where dots are arranged separately, the increase in density cannot be disregarded. Therefore, it is effective to generate an image by using dither patterns that determine densities based on the gross area of dots.

(2) In the first embodiment, the control unit 11 stores a table including dither patterns corresponding to different densities. The control unit 11 selects a dither pattern for each pixel corresponding to a specified gradation level (step S1-3), and executes image generation (step S1-4). Accordingly, the image generating apparatus 10 can quickly generate an image that is close to the image data by using such a previously stored table.

(3) In the first embodiment, for every dot displayed in a pixel, the number of dots displayed by the adjacent sub pixels 32, 33, 34, 35, which are on the right, left, top, and bottom of an object sub pixel, is counted. An overlapping area according to the counted number of dots is subtracted from the summed area of the total number of dots displayed in a pixel. Accordingly, the gross area of dots in a pixel can be easily calculated even when the dots are assumed to be circular, and the dither pattern table can be effectively generated.

Second Embodiment

Figure 4:
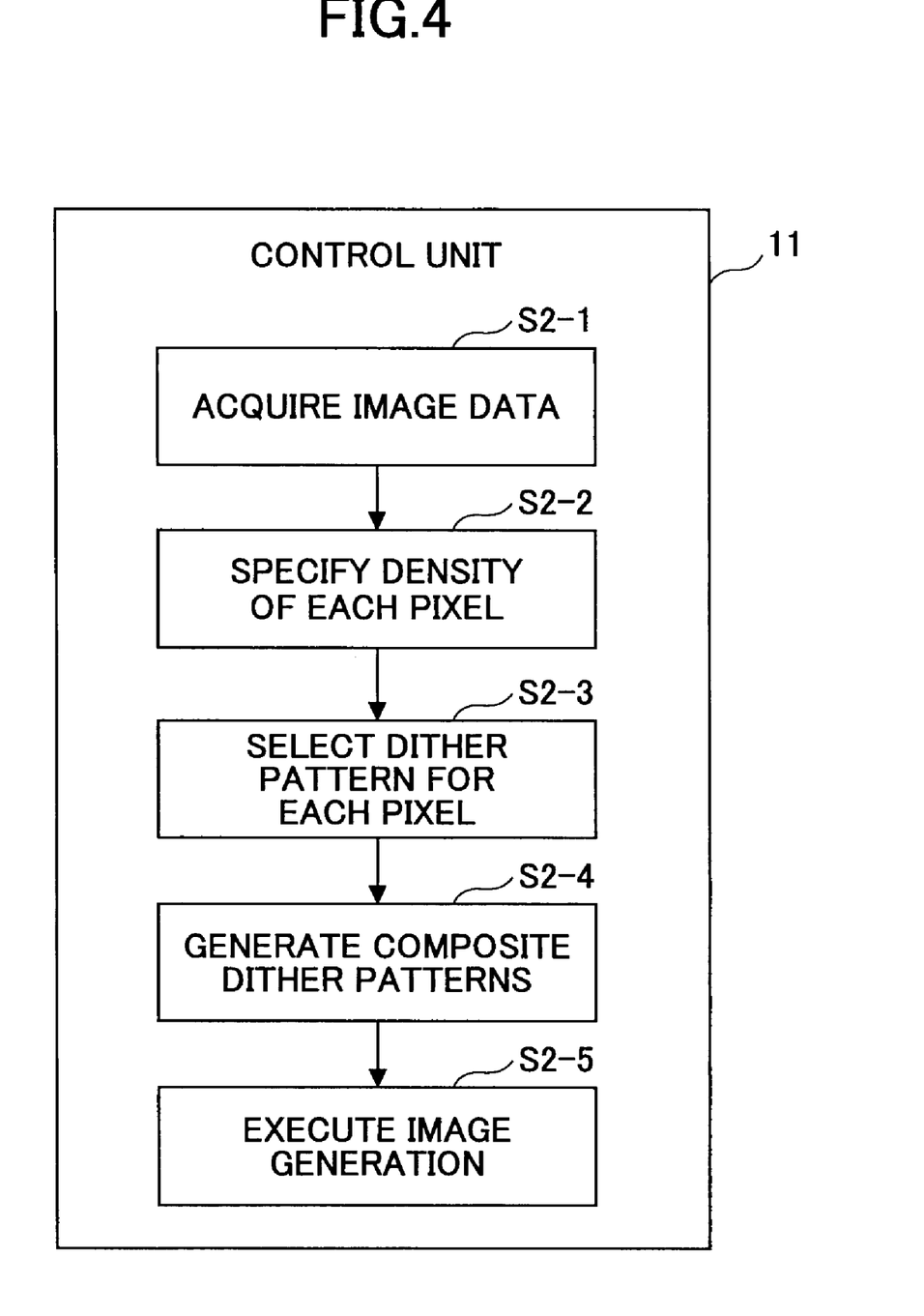
FIG. 4 is a flowchart of a process performed by an image generating apparatus according to a second embodiment of the present invention.
Figure 5:
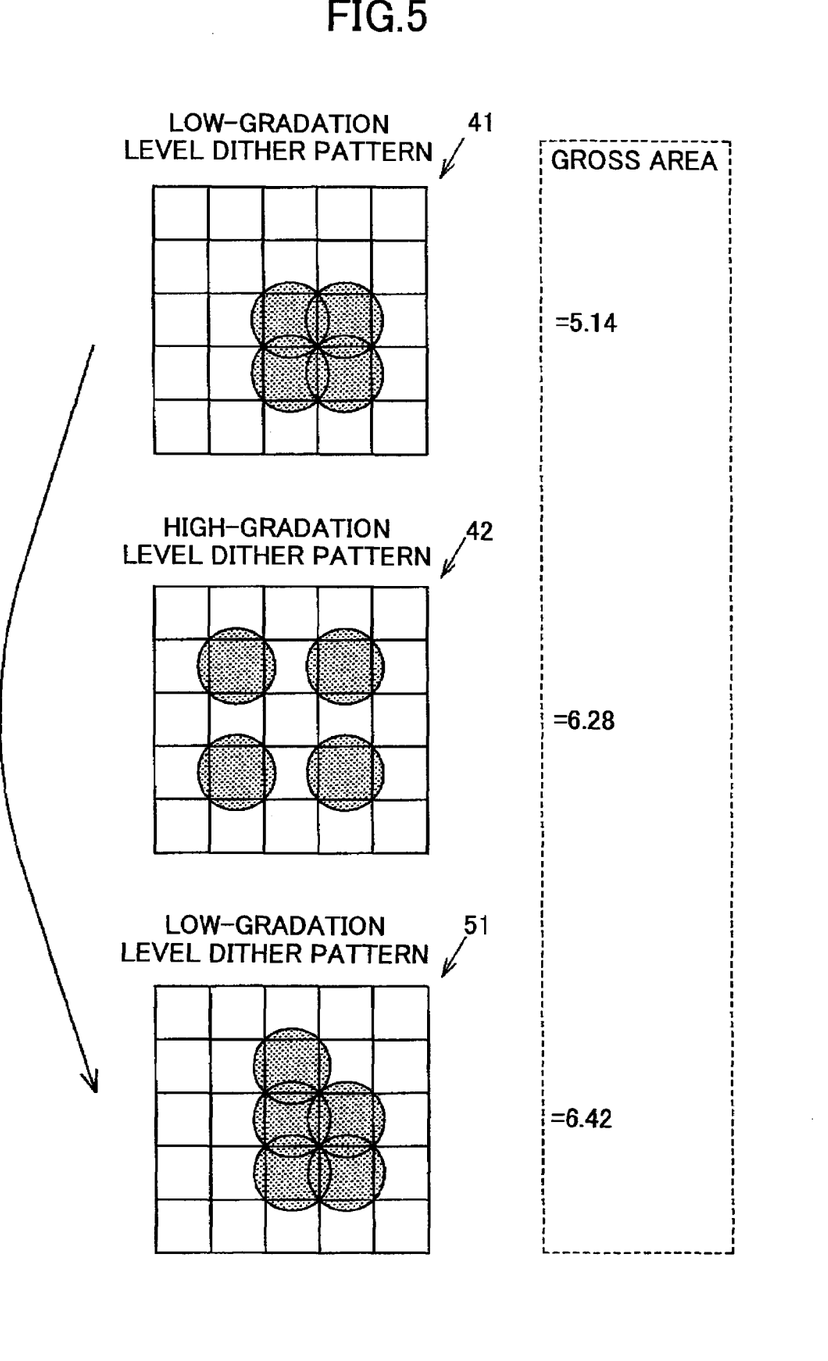
FIG. 5 illustrates low-gradation level dither patterns and a high-gradation level dither pattern according to the second embodiment of the present invention.

A second embodiment of the present invention is described with reference to FIGS. 4 and 5. In the second embodiment, elements corresponding to those in the first embodiment are denoted by the same reference numbers, and are not further described. In the second embodiment, it is assumed that the control unit 11 prints out a composite image in which a foreground image displayed at the front is combined with a latent image acting as a background image.

The control unit 11 stores a low-gradation level dither pattern table and a high-gradation level dither pattern table. Each of these dither pattern tables includes dither patterns corresponding to different gradations, as in the first embodiment. Furthermore, each of the dither patterns expresses a density corresponding to a gradation level with a combination of dots in sub pixels, as in the first embodiment.

In the second embodiment, the low-gradation level dither pattern table is used for generating a foreground image. In the dither patterns of the low-gradation level dither pattern table, most of the dots are partially overlapping each other, as in a dither pattern 41 shown in FIG. 5. Meanwhile, the high-gradation level dither pattern table is used for generating a background image. In the dither patterns of the high-gradation level dither pattern table, the dots are separately arranged, as in a dither pattern 42 shown in FIG. 5. Specifically, there are less overlapping dots in a high-gradation level dither pattern compared to a low-gradation level dither pattern of the same density.

In the conventional technology, a high-gradation level dither pattern and a low-gradation level dither pattern including the same number of dots are used to express the same density in a background image configured with high-gradation level dither patterns and a foreground image configured with low-gradation level dither patterns, respectively. As a result, the actual densities of the background image and the foreground image appear different. With reference to FIG. 5, the densities of the low-gradation level dither pattern 41, a low-gradation level dither pattern 51, and the high-gradation level dither pattern 42 are described in detail. To simplify the explanation, it is assumed that each pixel is divided into a sub matrix of 5×5, and the length of each side of each sub pixel is "1".

The gross area of the four dots displayed in the low-gradation level dither pattern 41 is 5.14, because the four dots are concentrated and have portions overlapping each other. Meanwhile, the gross area of the four dots displayed in the high-gradation level dither pattern 42 is 4×1.57=6.28, because the dots are separately arranged. In the conventional technology, the low-gradation level dither pattern 41 and the high-gradation level dither pattern 42 are both used to express the same density of 4/25, because both have four dots included in a pixel. However, the actually output low-gradation level dither pattern 41 and the actually output high-gradation level dither pattern 42 have different densities, i.e., 5.14/25 and 6.28/25. As a result, there are cases where a background image and a foreground image are disadvantageously distinguished from each other.

Meanwhile, in the low-gradation level dither pattern 51, there are five dots overlapping each other, and the gross area of dots per pixel is 6.42. Accordingly, the gross area (6.28) of dots displayed by the high-gradation level dither pattern 42 displaying four dots is closer to the gross area (6.42) of dots displayed by the low-gradation level dither pattern 51 displaying five dots, rather than the gross area (5.14) of dots displayed by the low-gradation level dither pattern 41 displaying the same number of dots (four dots) as the high-gradation level dither pattern 42. Thus, the actual densities of the background image and the foreground image in the output images can be made closer by using the dither pattern 51 as a low-gradation level dither pattern that has substantially the same density as the high-gradation level dither pattern 42, instead of using the dither pattern 41.

Next, a process according to the second embodiment performed by the image generating apparatus 10 is described with reference to FIG. 4.

The control unit 11 of the image generating apparatus 10 acquires, via the image data acquiring unit 12, image data of a foreground image and image data of a background image (step S2-1). Next, similarly to the first embodiment, the control unit 11 detects the density of each pixel in both sets of acquired image data (step S2-2).

The control unit 11 selects a dither pattern for each pixel in both sets of acquired image data (step S2-3). Specifically, the control unit 11 selects dither patterns corresponding to densities of the pixels in the background image from the high-gradation level dither patterns. Furthermore, the control unit 11 selects dither patterns corresponding to densities of the pixels in the foreground image from the low-gradation level dither patterns.

Next, the control unit 11 generates composite dither patterns (Step S2-4). Specifically, the control unit 11 combines the dither patterns selected in step S2-3.

The control unit 11 then executes image generation using the combined dither patterns (step S2-5). Specifically, the control unit 11 generates command signals using the combined dither patterns, and outputs them to the print executing unit 13. Accordingly, a composite image is printed, in which a foreground image is combined with a background image.

According to the second embodiment, in addition to similar effects as those of the first embodiment described in (1)-(3), the following effects can be achieved.

(4) In the second embodiment, the control unit 11 stores a low-gradation level dither pattern table for generating a foreground image and a high-gradation level dither pattern table for generating a background image. These dither pattern tables include dither patterns corresponding to densities determined by gross areas of dots per pixel. In the second embodiment, the gross area of dots is taken into account instead of the number of dots in selecting a low-gradation level dither pattern having substantially the same density as the high-gradation level dither pattern 42, and therefore, the dither pattern 51 having a gross area closer to that of the high-gradation level dither pattern 42 is used instead of using the dither pattern 41 including the same number of dots as the high-gradation level dither pattern 42. In this manner, dither patterns having the same gross areas are used for the foreground image and the background image. Accordingly, when the density of a foreground image is the same as the density of a background image in image data, the actual output densities also appear to be the same. Thus, when the same densities are intentionally applied to both the foreground image and the background image so as to make the background image unrecognizable, it is possible to prevent the background from being clearly visible in the printout.

The above-described embodiments can be modified as described below.

Figure 6:
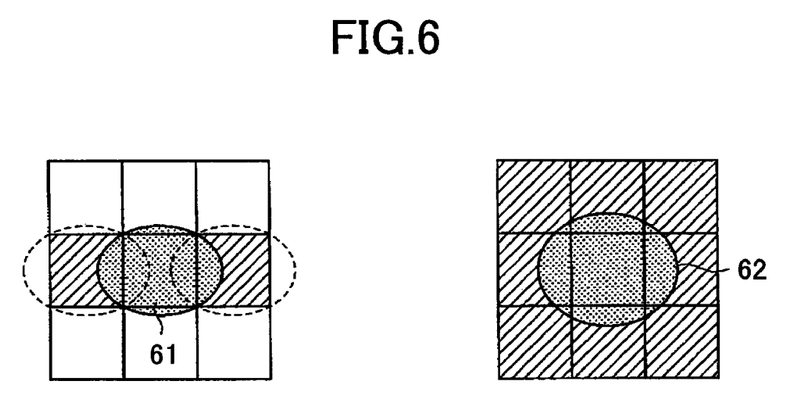
FIG. 6 illustrates the process of calculating a gross area of dots in a pixel in a modified example.

In the above-described embodiments, the dots are circular when calculating the gross areas. However, the shapes of the dots are not limited thereto in calculating the gross area; the gross area that determines the density can be calculated according to any shape of dot. In the electrophotographic method, it is considered that the dot shapes are determined according to the spot shapes of laser beams that generate images. Therefore, the dot shapes can be not only circular but also elliptical or oval, etc, as long as they represent the spot shapes of laser beams. For example, as shown in FIG. 6, the gross area can be calculated assuming that the dots are elliptical, and a dither pattern based on this gross area can be used. In the image generating apparatus 10 employing the electrophotographic method, the spots of laser beams used for image formation are circular or elliptical. Thus, by using circular or elliptical dots, the actual output density can be made closer to the density indicated by the image data, compared to the conventional technology in which the dots are assumed to be squares. Furthermore, it is possible to use both circular dots and elliptical dots. For example, in the image generating apparatus 10, when the laser unit is arranged at the center of the photoconductor, dither patterns with elliptical dots can be applied for pixels at edges of an image and dither patterns with circular dots can be applied for pixels in the center of the image.

In the above-described embodiments, calculation of the overlapping areas of dots involves the process of counting the number of dots displayed by the four sub pixels 32-35 adjacent to the sub pixel displaying the dot 31. However, the dots to be counted when calculating the overlapping areas are not limited to those displayed by the four adjacent sub pixels. For example, depending on the shapes of the dots, there may be cases of counting only dots displayed by two surrounding sub pixels or dots displayed by sub pixels that are not adjacent but are nearby. For example, when the elliptical shape is oblong as illustrated with a dot 61 shown in FIG. 6, the overlapping areas can be calculated by counting only the number of dots displayed by sub pixels located on the left and the right of the sub pixel displaying the dot 61. Furthermore, as illustrated with a dot 62 shown in FIG. 6, the lengthwise diameter and the widthwise diameter of the elliptical dot may be longer than the length and the width of a sub pixel. In such a case, the overlapping areas can be calculated by counting the number of dots displayed by eight sub pixels (filled with oblique lines) surrounding the sub pixel displaying the dot 62, which is more than counting only the dots at sub pixels on the right, left, top, and bottom of the sub pixel displaying the dot 62.

In the above-described embodiments, the control unit 11 selects dither patterns corresponding to detected densities from the stored dither pattern table, and generates an image based on the selected dither patterns. Alternatively, the control unit 11 can calculate the gross area of dots when image data are received, and determine a dither pattern based on this gross area. For example, after the control unit 11 selects a dither pattern for each pixel according to a gradation level in (step S1-3), the control unit 11 can correct the density if it is affected by dots sticking out from adjacent pixels. For example, if an object dot is positioned at the edge of an adjacent pixel, it means that the object dot sticks out into a sub pixel of another pixel, which is adjacent to a sub pixel of the object dot. Accordingly, the control unit 11 can recalculate relevant gross areas. Specifically, if the gross area increases because a dot sticks in from an adjacent pixel or if the gross area decreases because the dot therein sticks out to an adjacent pixel, the control unit 11 can recalculate the gross area based on the selected dither patterns. The control unit 11 can correct the gross areas based on the recalculated values. Therefore, the density of the print-out image can be made even closer to the density of the image data. When low-gradation level dither patterns are combined with high-gradation level dither patterns as in the second embodiment, gross areas may increase due to this combination. Thus, it is possible to recalculate gross areas and make corrections accordingly.

In the above-described embodiments, the image generating apparatus 10 performs monochrome printing where black toner is used to express gray, which is a halftone color of black and white. The present invention is not limited thereto. The present invention can be applied to an image generating apparatus that performs color printing, in which toners of colors other than black are used to express halftone colors between the primary colors of the toner and white.

According to one embodiment of the present invention, the density of an image actually generated can be made closer to the density of the image data.

Further, according to one embodiment of the present invention, when the density of the foreground image and the density of the background image are the same in the image data, it is possible to make the actual output densities of the foreground image and the background image appear to be the same.

Further, according to one embodiment of the present invention, the gross area of a dither pattern can be easily calculated.

The present invention is not limited to the specifically disclosed embodiment, and variations and modifications may be made without departing from the scope of the present invention.

The present application is based on Japanese Priority Patent Application No. 2006-114384, filed on Apr. 18, 2006, the entire contents of which are hereby incorporated by reference.

What is claimed is:

1. An image generating apparatus employing an electrophotographic method for generating an image by performing area coverage modulation to express a halftone color according to a gross area of dots displayed in a pixel of the image, the image generating apparatus comprising:
    a control unit configured to generate the image, in response to receiving a pixel gradation instruction, in such a manner that the halftone color is expressed with a selected one of dither patterns corresponding to respective predetermined densities, each of the densities being determined by gross areas of dots calculated in view of shapes of the dots.

2. The image generating apparatus according to claim 1, wherein
    the control unit stores a table including plural said dither patterns corresponding to the respective predetermined densities, and
    the control unit detects a density of each pixel in the image based on image data of the image and selects one of the dither patterns from the table for each pixel in the image according to the detected density, so that the image is generated with the selected dither pattern.

3. The image generating apparatus according to claim 1, wherein
    the control unit includes a high-gradation level table including high-gradation dither patterns corresponding to respective predetermined densities in which the dots are separately arranged and a low-gradation level table including low-gradation dither patterns corresponding to respective predetermined densities in which many of the dots are partially overlapping each other, and
    the control unit generates a display image according to the densities defined by the low-gradation level table and generates a background image acting as a latent image of the display image according to the densities defined by the high-gradation level table.

4. The image generating apparatus according to claim 1, wherein
    the shapes of the dots are circular or elliptical, and
    the control unit calculates the gross area of the dots by using an overlapping area between adjacent dots in view of the circular or elliptical shapes of the dots.

5. The image generating apparatus according to claim 4, wherein each of the dither patterns is created by
    dividing the pixel into sub pixels, each of the sub pixels being configured to display one of the dots,
    counting, for each of the sub pixels displaying one of the dots, a number of dots displayed by nearby sub pixels,
    calculating the overlapping area based on the counted number of dots,
    calculating the gross area of the dots in the pixel by subtracting the calculated overlapping area from a value obtained by multiplying a total number of the circular or elliptical dots displayed in the pixel by an area of each of the dots, and
    determining, based on the calculated gross area, the density to which the dither pattern corresponds.

6. The image generating apparatus according to claim 5, wherein
    the counted number of the dots is a number of dots displayed by adjacent sub pixels on right, left, top, and bottom sides of the each of the sub pixels displaying one of the dots.

7. A machine readable product storing an image generating program for causing a control unit processor to execute an electrophotographic method for generating an image by performing area coverage modulation to express a halftone color according to a gross area of dots displayed in a pixel of the image, the image generating program product causing a control unit to execute a procedure comprising the step of:

generating the image, in response to receiving a pixel gradation instruction, in such a manner that the halftone color is expressed with a selected one of dither patterns corresponding to respective predetermined densities, each of the densities being determined by the gross area of dots calculated in view of shapes of the dots.

\* \* \* \* \*